US009009396B2

(12) United States Patent
Nemazie

(10) Patent No.: US 9,009,396 B2
(45) Date of Patent: *Apr. 14, 2015

(54) PHYSICALLY ADDRESSED SOLID STATE DISK EMPLOYING MAGNETIC RANDOM ACCESS MEMORY (MRAM)

(71) Applicant: Avalanche Technology, Inc., Fremont, CA (US)

(72) Inventor: Siamack Nemazie, Los Altos Hills, CA (US)

(73) Assignee: Avalanche Technology, Inc., Fremont, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/745,686

(22) Filed: Jan. 18, 2013

(65) Prior Publication Data

US 2014/0047164 A1    Feb. 13, 2014

Related U.S. Application Data

(63) Continuation-in-part of application No. 13/673,866, filed on Nov. 9, 2012, and a continuation-in-part of application No. 13/570,202, filed on Aug. 8, 2012.

(51) Int. Cl.
*G06F 12/00* (2006.01)
*G06F 12/02* (2006.01)
*G06F 13/00* (2006.01)
*G06F 13/28* (2006.01)

(52) U.S. Cl.
CPC .... *G06F 12/0246* (2013.01); *G06F 2212/7201* (2013.01); *G06F 2212/7207* (2013.01)

(58) Field of Classification Search
USPC .............. 711/103, 162; 714/15; 707/639
See application file for complete search history.

(56) References Cited

U.S. PATENT DOCUMENTS

| 5,900,014 | A  | * | 5/1999  | Bennett ..................... 711/138 |
| 6,467,022 | B1 |   | 10/2002 | Buckland et al. |
| 2005/0068802 | A1 |   | 3/2005  | Tanaka |
| 2006/0215449 | A1 | * | 9/2006  | Nam et al. ............... 365/185.03 |
| 2006/0253645 | A1 |   | 11/2006 | Lasser |
| 2008/0034154 | A1 | * | 2/2008  | Lee et al. ...................... 711/103 |
| 2008/0219044 | A1 | * | 9/2008  | Yoon et al. ................... 365/158 |
| 2010/0037001 | A1 |   | 2/2010  | Langlois et al. |
| 2010/0169553 | A1 | * | 7/2010  | Yano et al. .................... 711/103 |
| 2011/0082996 | A1 | * | 4/2011  | Wester et al. ................. 711/170 |

* cited by examiner

*Primary Examiner* — Yaima Rigol
*Assistant Examiner* — Mark Giardino, Jr.
(74) *Attorney, Agent, or Firm* — Maryam Imam; IPxLaw Group LLP

(57) ABSTRACT

A computer system includes a central processing unit (CPU), a system memory coupled to the CPU and including flash tables, and a physically-addressable solid state disk (SSD) coupled to the CPU. The physically-addressable SSD includes a flash subsystem and a non-volatile memory and is addressable using physical addresses. The flash subsystem includes one or more copies of the flash tables and the non-volatile memory includes updates to the copy of the flash tables. The flash tables include tables used to map logical to physical blocks for identifying the location of stored data in the physically addressable SSD, wherein the updates to the copy of the flash tables and the one or more copies of the flash tables are used to reconstruct the flash tables upon power interruption.

19 Claims, 9 Drawing Sheets

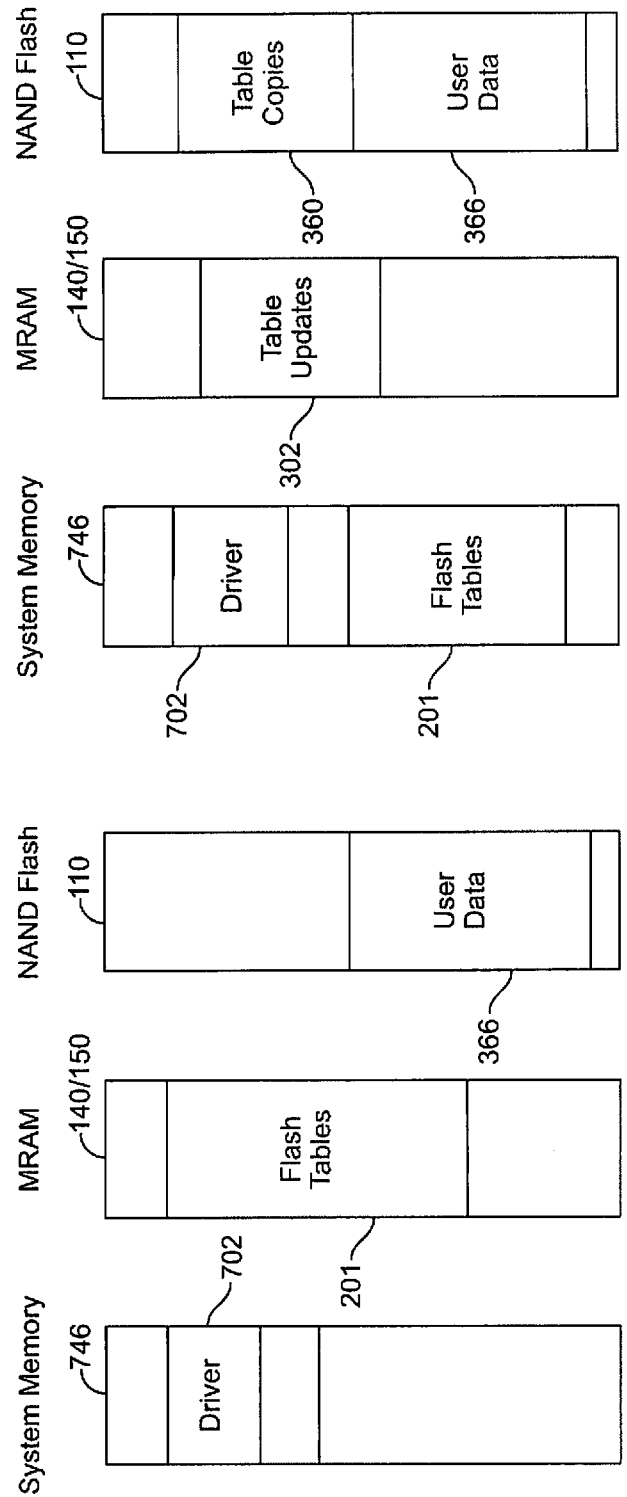

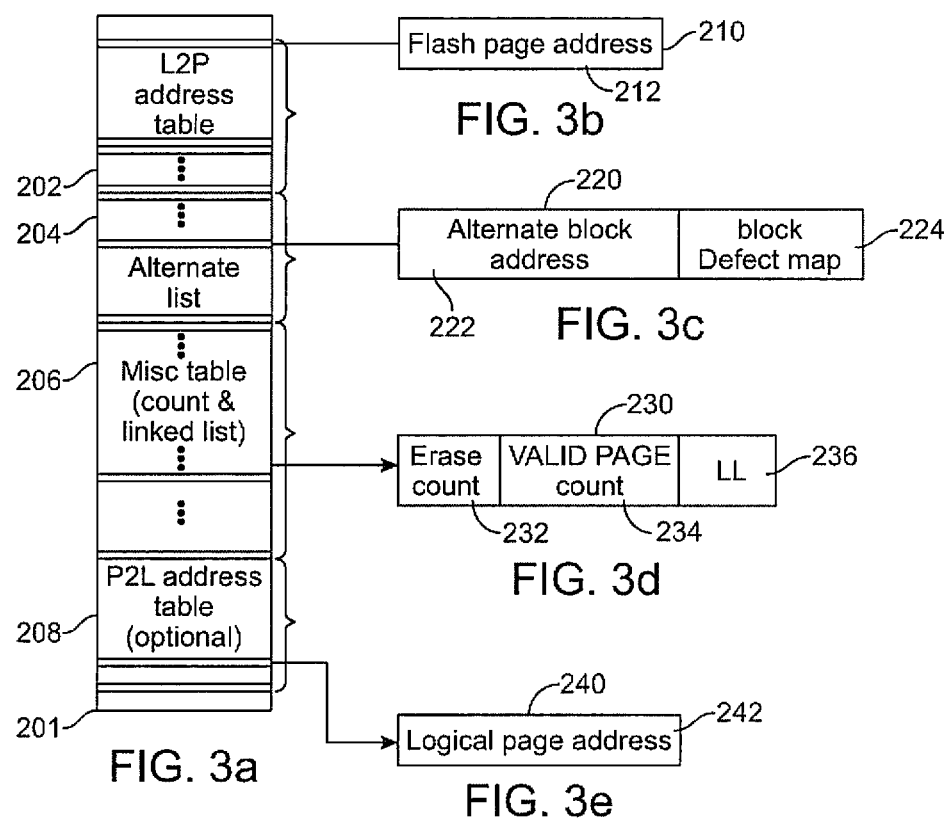

PHYSICALLY ADDRESSED SOLID STATE DISK EMPLOYING MAGNETIC RANDOM ACCESS MEMORY (MRAM)

CROSS REFERENCE TO RELATED APPLICATIONS

This application is a continuation-in-part of U.S. patent application Ser. No. 13/673,866, filed on Nov. 9, 2012, by Siamack Nemazie and Dan Le, and entitled "SOLID STATE DISK EMPLOYING FLASH AND MAGNETIC RANDOM ACCESS MEMORY (MRAM)", which is a continuation-in-part of U.S. patent application Ser. No. 13/570,202, filed on Aug. 8, 2012, by Siamack Nemazie and Ngon Van Le, and entitled "SOLID STATE DISK EMPLOYING FLASH AND MAGNETIC RANDOM ACCESS MEMORY (MRAM)", which claims priority U.S. Provisional Application No. 61/538,697, filed on Sep. 23, 2011, entitled "Solid State Disk Employing Flash and MRAM", by Siamack Nemazie, incorporated herein by reference as though set forth in full.

FIELD OF THE INVENTION

The invention relates generally to a solid state storage device and particularly to a physically-addressed solid state storage device coupled to communicate with flash memory and executing software to perform all or part of flash block management.

BACKGROUND OF THE INVENTION

Solid State Drives (SSDs), using flash memory, have become a viable alternative to Hard Disc Drives in many applications. Such applications include storage for notebook, tablets, servers and network attached storage appliances. In notebook and tablet applications, storage capacity is not too high, and power and or weight and form factor are key metric. In server applications power and performance (sustained read/write, random read/write) are key metrics. In network attached storage appliances capacity, power and performance are key metrics, and capacity is achieved by employing a plurality of SSDs in the appliance. The SSD may be directly attached to the system via a bus such as SATA, SAS or PCIe.

Flash memory is a block based non-volatile memory with each block is organized into and made of various pages. After a block is programmed it must be erased prior to programming it again, most flash memory require sequential programming of pages within a block. Another limitation of flash memory is that blocks can be erased for a limited number of times, thus frequent erase operations reduce the life time of the flash memory. A Flash memory does not allow in-place updates. That is it cannot overwrite new data into existing data. The new data are written to erased areas (out-of-place updates), and the old data are invalidated for reclamation in the future. This out-of-place update causes the coexistence of invalid (i.e. outdated) and valid data in the same block. Garbage Collection is the process to reclaim the space occupied by the invalid data, by moving valid data to a new block and erasing the old block. Garbage collection results in significant performance overhead as well as unpredictable operational latency. As mentioned flash memory blocks can be erased for a limited number of times. Wear leveling is the process to improve flash memory life time by evenly distributing erases over the entire flash memory (within a band).

The management of blocks within flash based memory system including SSDs is referred to as flash block management and includes: Logical to Physical Mapping, Defect management for managing defective blocks (blocks that were identified to be defective at manufacturing and grown defective blocks thereafter), wear leveling to keep program/erase cycle of blocks within a band, keeping track of free available blocks, garbage collection for collecting valid pages from a plurality of blocks (with a mix of valid and invalid page) into one block and in the process creating free blocks. The flash block management requires maintaining various tables referred to as flash block management tables (or "flash tables"). These tables are generally proportional to the capacity of SSD. Generally the flash block management tables can be constructed from metadata maintained on flash pages. Metadata is non-user information written on a page. Such reconstruction is time consuming and generally performed very infrequently upon recovery during power up from a failure (such as power fail).). In one prior art technique, technique the flash block management tables are maintained in a volatile memory, and as mentioned the flash block management tables is constructed from metadata maintained on flash pages during power up. In another prior art technique, the flash block management tables are maintained in a battery-backed volatile memory, utilized to maintain the contents of volatile memory for an extended period of time until power is back and tables can be saved in flash memory. In yet another prior art technique the flash block management tables are maintained in a volatile RAM, the flash block management tables are periodically and/or based on some events (such as a Sleep Command) saved (copied) back to flash, and to avoid the time consuming reconstruction upon power up from a power failure additionally a power back-up means provides enough power to save the flash block management tables in the flash in the event of a power failure. Such power back-up may comprise of a battery, a rechargeable battery, or a dynamically charged super capacitor.

The flash block management is generally performed in the SSD and the tables reside in the SSD. Alternatively the flash block management may be performed in the system by a software or hardware, commands additionally include commands for flash management commands and the commands use physical address rather than logical address. An SSD wherein the command use physical address is referred to as Physically Addressed SSD. The flash block management tables are maintained on the (volatile) system memory.

In a system employing physically addressed SSD which maintains the flash block management tables on the system memory that has no power back means for the system and no power back means for the system memory, the flash block management tables that resides in the system memory will be lost and if copies are maintained in the flash onboard the SSD, the copies may not be updated and/or may be corrupted if power failure occurs during the time a table is being saved (or updated) in the flash memory. Hence, during a subsequent power up, during initialization the tables have to be inspected for corruption due to power fail and if necessary recovered. The recovery requires reconstruction of the tables to be completed by reading metadata from flash pages and results in further increase in delay for system to complete initialization. The process of completely reconstruction of all tables is time consuming, as it requires metadata on all pages of SSD to be read and processed to reconstruct the tables. Metadata is non-user information written on a page. This flash block management table recovery during power up will further delay the system initialization, the time to initialize the system is a key metric in many applications.

Additionally a system employing physically addressed SSD it would be advantages to issue writes in units of pages of flash and aligned to a page boundary and avoid partial page or misaligned write to the SSD, as it avoids reading from SSD and merging modified portion of the page with unmodified portion of the page. As information is kept in system memory the partial page is subject to loss in the event of power outage.

Yet another similar problem of data corruption and power fail recovery arises in SSDs and also HDDs when write data for write commands (or queued write commands when command queuing is supported) is cached in a volatile system memory and command completion issued prior to writing to media (flash or Hard Disc Drive). It is well known in the art that caching write data for write commands (or queued write commands when command queuing is supported) and issuing command completion prior to writing to media significantly improves performance.

As mentioned before in some prior art techniques, a battery-backed volatile memory is utilized to maintain the contents of volatile memory for an extended period of time until power is back and tables can be saved in flash memory.

Battery backup solutions for saving system management data or cached user data during unplanned shutdowns are long-established but have certain disadvantage including up-front costs, replacement costs, service calls, disposal costs, system space limitations, reliability and "green" content requirements.

What is needed is a system employing physically addressed SSD to reliably and efficiently preserve flash block management tables in the event of a power interruption.

SUMMARY OF THE INVENTION

Description of the Prior Art

Briefly, in accordance with one embodiment of the invention, a computer system is disclosed to include a central processing unit (CPU), a system memory coupled to the CPU and including flash tables, and a physically-addressable solid state disk (SSD) coupled to the CPU. The physically-addressable SSD includes a flash subsystem and a non-volatile memory and is addressable using physical addresses. The flash subsystem includes one or more copies of the flash tables and the non-volatile memory includes updates to the copy of the flash tables. The flash tables include tables used to map logical to physical blocks for identifying the location of stored data in the physically addressable SSD, wherein the updates to the copy of the flash tables and the one or more copies of the flash tables are used to reconstruct the flash tables upon power interruption.

These and other objects and advantages of the invention will no doubt become apparent to those skilled in the art after having read the following detailed description of the various embodiments illustrated in the several figures of the drawing.

IN THE DRAWINGS

FIG. 1a shows the tables stored in an embodiment of FIG. 1

FIG. 1b shows the tables stored in another embodiment of FIG. 1

FIG. 3a shows a flash management table 201, in accordance with an embodiment of the invention.

FIG. 3b shows further details of the table 212.

FIG. 3c shows further details of the entry 220 of table 204.

FIG. 3d shows further details of the entry 230 of table 206.

FIG. 3e shows further details of the entry 240 of table 208 including field 242.

Figure 4:
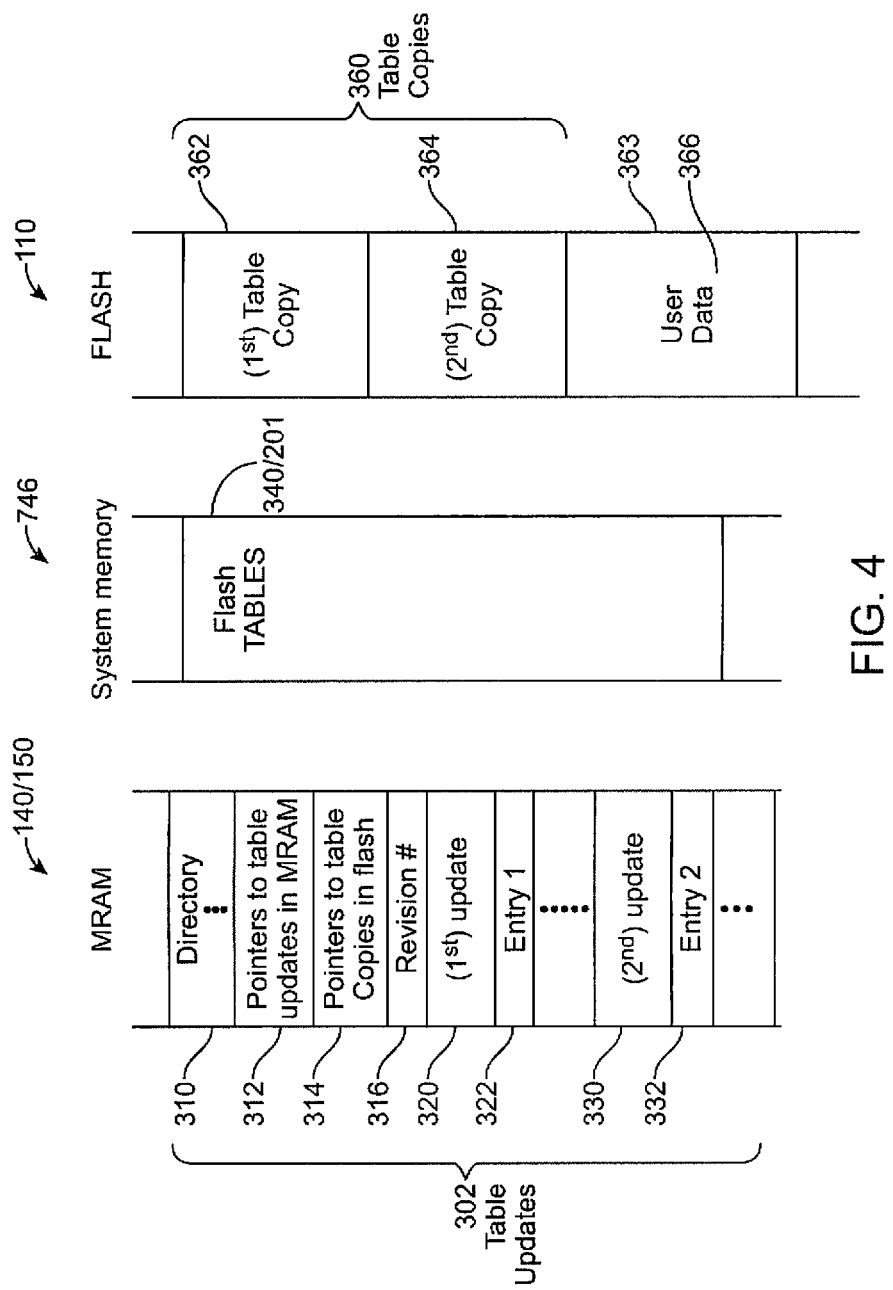

FIG. 4 shows exemplary data structures stored in each of the MRAM 140/150, System Memory 746, and flash 110.

Figures 4A, 4B:
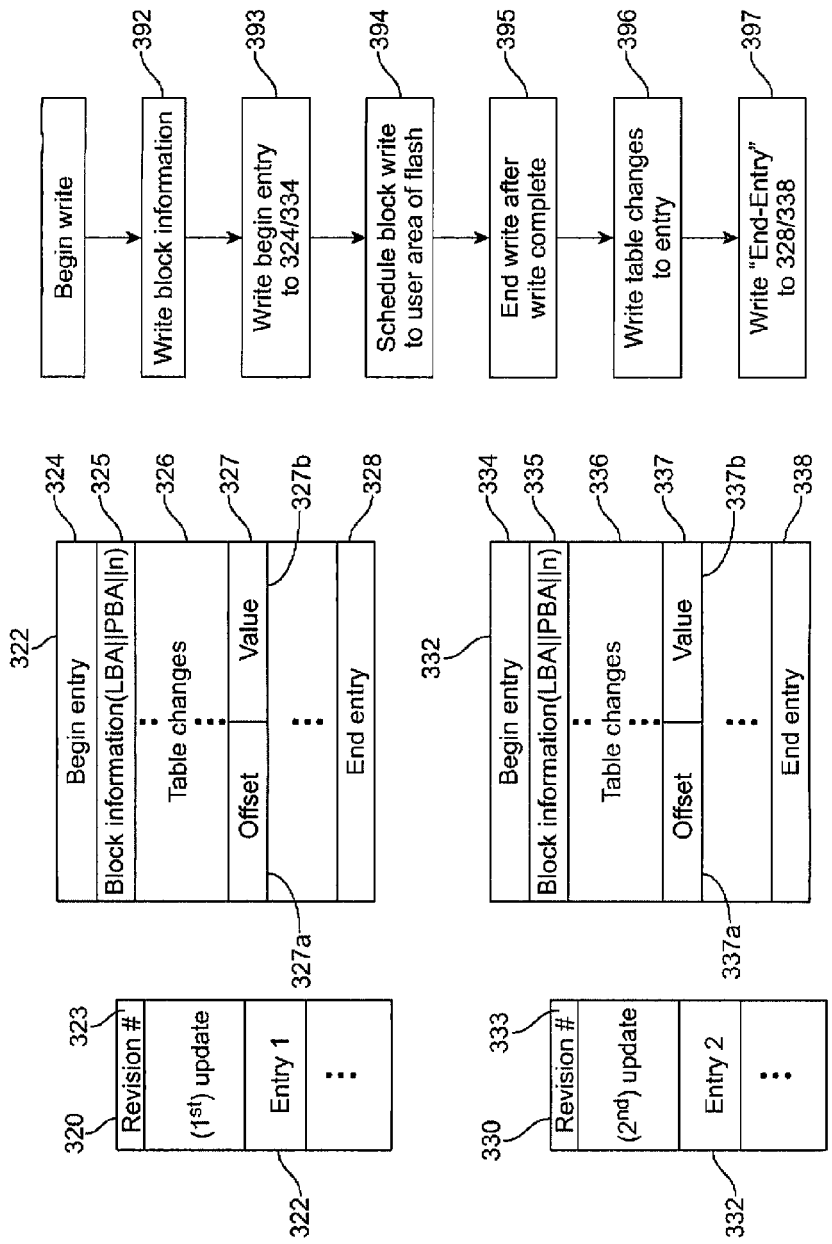

FIG. 4a shows exemplary details of entries 322/332 in updates 320/330

FIG. 4b shows process flow of the relevant steps performed in saving flash tables in system memory to flash.

Figure 5:
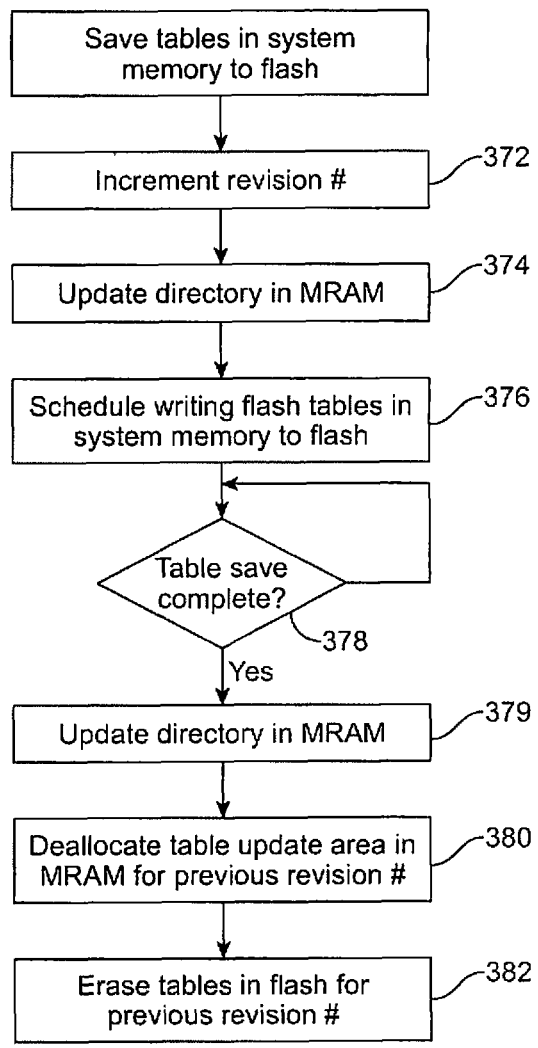

FIG. 5 shows a process flow of the relevant steps performed in saving flash tables in system memory to flash using the embodiments shown and discussed relative to other embodiments herein and in accordance with a method of the invention.

Figure 6:
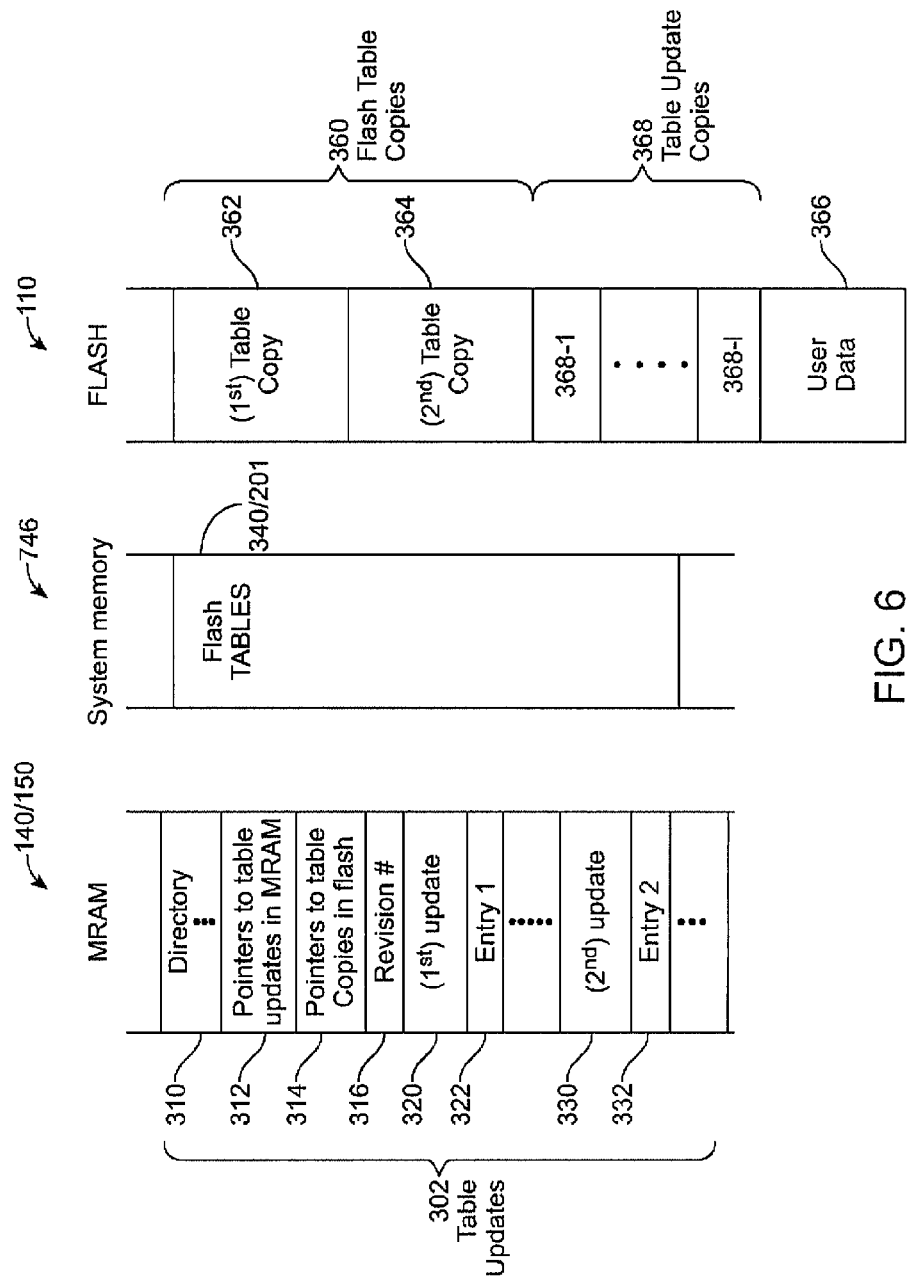

FIG. 6 shows another exemplary data structures stored in each of the MRAM 140/150, System Memory 746, and flash 110 for yet another embodiment of the invention.

DETAILED DESCRIPTION OF THE PREFERRED EMBODIMENTS

Figure 1:
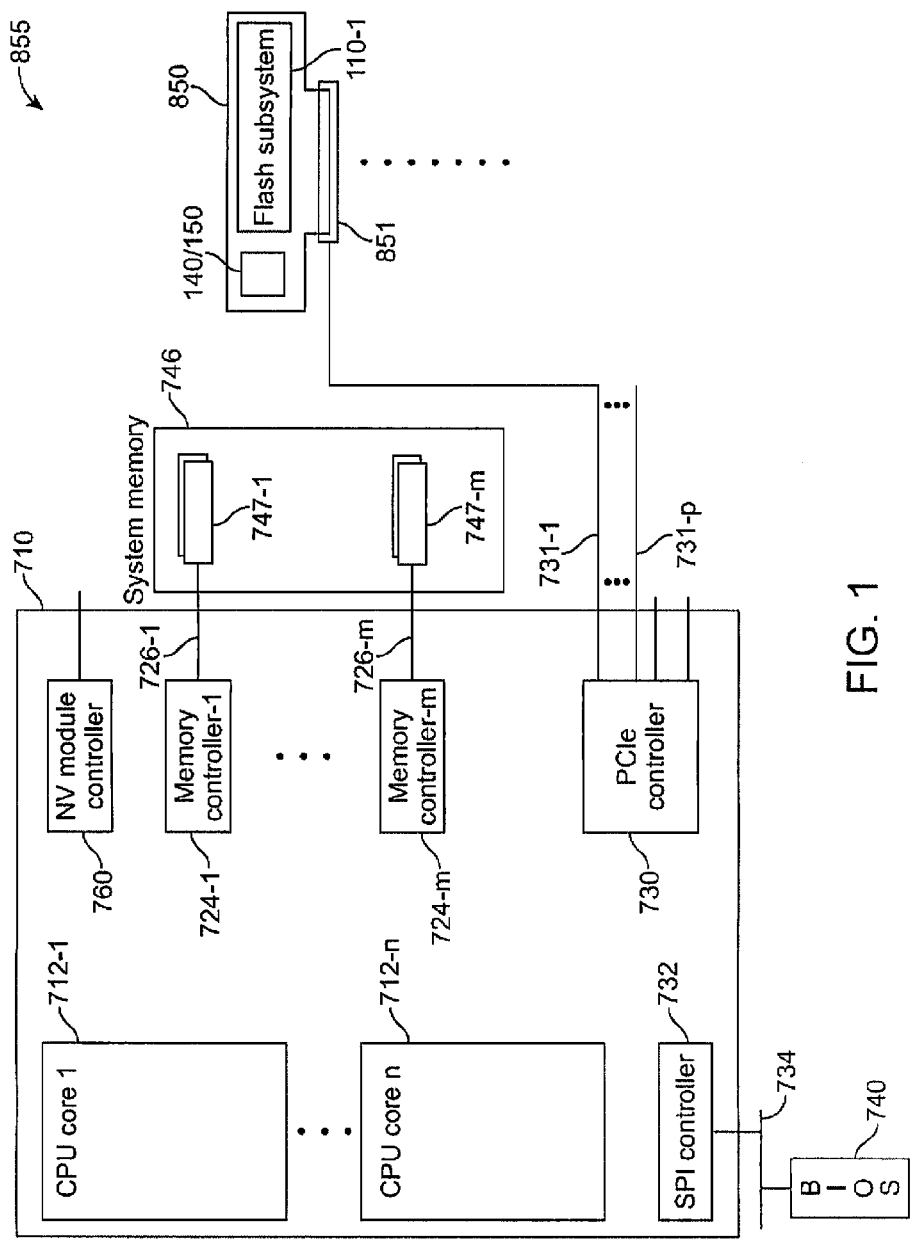
FIG. 1 shows the block diagram of the system of present invention

Referring now to FIG. 1, a computer system 855 is shown to include a Central Processor Unit (CPU) 710, a system memory 746, a basic input and output system (BIOS) 740, an optional HDD 739 (not shown), and one or more physically addressed solid state disk 850, in accordance with an embodiment of the invention.

The CPU 710 of the system 855 is shown to include a bank of CPU cores 712-1 through 712-n, a bank of memory controllers 724-1 through 724-m, which are shown coupled to a bank of memory channels 726-1 through 726-m. The CPU 710 is further shown to include a PCIe controller 730 coupled to a bank of PCIe buses 731-1 through 731-p, an SPI controller 732 coupled to BIOS 740.

The system memory 746 is shown comprised of a bank of volatile RAM, such as DRAM, modules 747-1 through 747-m which are shown coupled to the memory controllers 724-1 through 724-m via memory channels 726-1 through 726-m.

In the system 855 of FIG. 1, flash block management is generally performed by a software driver 702 (shown in FIGS. 1a and 1b), which is loaded during system initialization after power up. Flash block management, generally known to those in the art, uses commands, such as and in addition to user commands, for flash management (including garbage collection, wear leveling, saving flash tables, . . . ) and the commands use physical addresses rather than logical addresses.

A solid state drive (SSD), with commands using physical addresses and flash block management not being performed by the SSD is referred generally to as a "physically-addressed SSD" or "paSSD". The flash block management tables are maintained in the (volatile) system memory 746.

In some embodiment of the invention, flash block management tables are maintained in the system memory 746 and are nearly periodically saved in the flash subsystem 110 onboard the paSSD 850 and the parts of the tables that are updated since the last save are additionally maintained in the MRAM that is onboard the paSSD via methods that physically address the MRAM rather than the flash.

FIGS. 1a and 1b generally show exemplary tables of the flash block management tables. For example, FIG. 1a shows exemplary system memory 746, a MRAM 140/150, and a NAND flash included in the flash subsystem 110, in accordance with an embodiment of the invention. In FIG. 1a, a driver 702 is shown to be maintained in the system memory 746, flash tables 201 is shown to be maintained in the MRAM 140/150, and user data 366 is shown to be maintained in the NAND flash of the flash subsystem 110. In FIG. 1b, the system memory 746 is shown to maintain a driver 702 and flash tables 201. The MRAM 140/150 is shown to maintain the table updates 302, and the NAND flash of the subsystem 110 is shown to maintain the table copies 360 and the user data 366. Further details of FIGS. 1a and 1b is disclosed in U.S. patent application Ser. No. 13/570,202, filed on Aug. 8, 2012, by Siamack Nemazie, and entitled "SOLID STATE DISK EMPLOYING FLASH AND MAGNETIC RANDOM ACCESS MEMORY (MRAM)".

As shown in FIG. 1b the flash table 201 is maintained in system memory 746, table updates 302 in MRAM 140/150 and table copies 360 in flash subsystem 110. As shown in FIGS. 1a and 1b information (also referred to as "user data") 366 from the host (CPU core 712) is stored in flash subsystem 110. A method to physically address the MRAM rather than the flash subsystem is to map all or part of the MRAM address space to a reserved range of flash address space that is typically the top part of address space. Another method includes designating specific field in the command block to designate commands for accessing the MRAM. Other mapping methods fall within the scope of the methods of the invention In another embodiment of FIG. 1a, the flash table 201 is saved in the MRAM 140/150. As shown in FIG. 1a, the flash table 201 is maintained in the MRAM 140/150.

Figure 2:
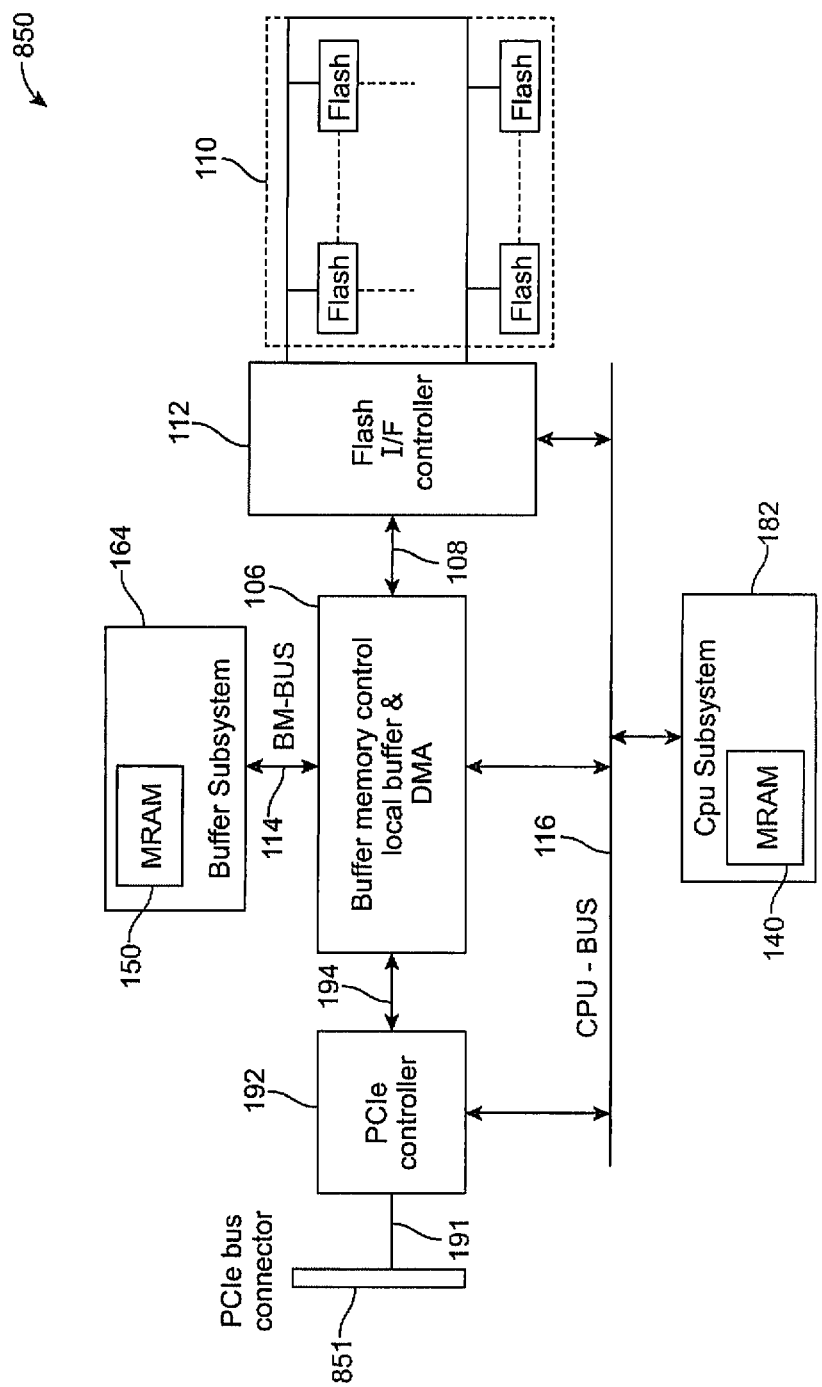
FIG. 2 shows the block diagram of solid state storage device 850, in accordance with an embodiment of the invention.

FIG. 2 shows further details of the solid state disk 850, in accordance with an embodiment of the invention. The solid state disk 850 is shown to include a PCIe bus connector 851, a PCIe bus interface controller 192, a buffer memory control block 106, a flash interface controller 112, a flash subsystem 110, a buffer subsystem 164, and a central processor unit (CPU) subsystem 182, in accordance with an embodiment of the invention.

The PCIe bus connector 851, as shown in FIG. 1, couples the solid state disk 850 to the PCIe controller 730 of the CPU 710. The PCIe bus 191 couples the PCIe interface controller 192 to the PCIe controller 730 through the connector 851. The PCIe interface controller 192 is shown coupled to the buffer memory block 106 through the PCIe controller bus 194. The buffer memory control 106 is shown coupled to the flash interface controller 112 through the flash controller bus 108. The buffer subsystem 164 is shown coupled to the buffer memory block 106 and the PCIe interface controller 192. The PCIe interface controller 192, the buffer memory control block 106 and the flash interface controller 112 are each shown coupled to the CPU subsystem 182 through the CPU bus 116. The flash interface controller 112 is shown coupled to the flash subsystem 110.

The PCIe interface controller 192 sends and receives commands/status and data, and manages the PCIe t interface protocol. The buffer memory control 106 transfers data between the buffer subsystem 164 and the PCIe I/F, Flash I/F and the CPU subsystem. The buffer subsystem 160 stores user and system management information. The flash interface controller 112 interfaces with flash subsystem 110. The flash subsystem 110 is used as persistent storage for storage of data. The CPU subsystem 174 controls and manages the execution of host commands.

The flash subsystem 110 is shown to include a number of flash memory components or devices, which can be formed on a single semiconductor or die or on a number of such devices.

The buffer subsystem 164 can take on various configurations. In some configurations, it includes MRAM 150, such as that which is shown in FIG. 2.

The CPU subsystem 182 can take on various configurations. In some configurations, it includes CPU, RAM and ROM, an in some configurations, it includes MRAM 140 such as that which is shown in FIG. 2. The CPU subsystem 182 can access the buffer system 164 concurrently with other accesses. CPU subsystem 182 accesses to buffer subsystem 164 are interleaved with PCIe I/F and flash I/F accesses to the buffer subsystem 164.

Figure 2A:
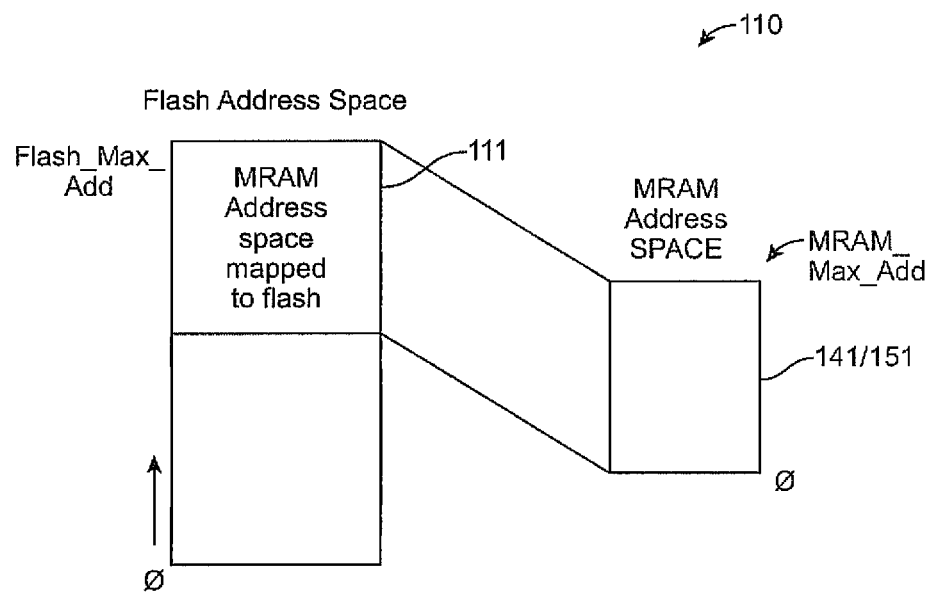
FIG. 2a shows an exemplary flash address space, in accordance with an embodiment of the invention.

FIG. 2a shows an exemplary flash address space, in accordance with an embodiment of the invention. In some embodiments, the flash subsystem 110 includes a flash address space that includes a MRAM address space mapped to flash address space 111. The flash address space maintains flash memory addresses 0 to Flash_Max_Add and the space 111 occupies a portion of this space, typically the top thereof, such as shown, in an exploded view in FIG. 2a, as the MRAM address space 141/151 with MRAM addresses 0 to MRAM_Max_Add. In accordance with the foregoing, MRAM addresses are physically mapped, in whole or in part, to a reserved range of flash address space, i.e. space 111. It is noted that the mapping of FIG. 2a is one of a number of other methods contemplated.

Figure 2B:
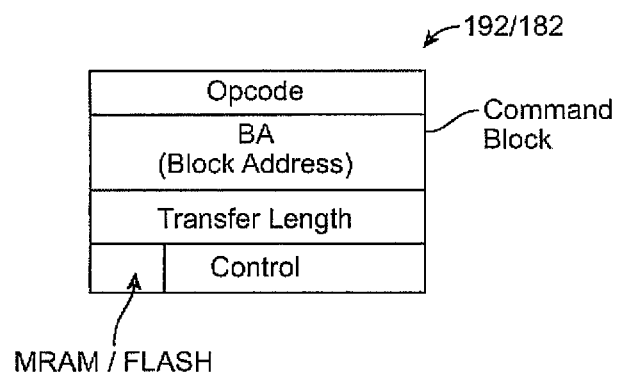
FIG. 2b shows an exemplary command block, in accordance with an embodiment of the invention.

FIG. 2b shows an exemplary command block, in accordance with an embodiment of the invention. As shown in FIG. 2b, a command block 192/182 includes an opcode, a block address (BA), a transfer length, and control. Further included in the command block 192/182 is a MRAM/Flash bit or flag indicative of whether the command block relates to MRAM or to flash memory.

In operation, the computer system 850 includes the CPU 710 and the system memory 746 and the physically-addressable SSD 850 that is addressable using physical addresses associated with user data, provided by the CPU cores of the CPU 710, to be stored in or retrieved from the physically-addressed SSD in blocks. The system memory 746 includes flash tables 201 that is used to manage blocks in the physically addressable SSD, the flash tables (shown in FIG. 1b as flash tables 201) include tables used to map logical to physical blocks for identifying the location of stored data in the physically addressed SSD 850. The SSD 850 includes the non-volatile memory 140/150 and the flash subsystem 110. The subsystem 110 includes flash memory, such as the NAND flash shown in FIG. 1b, that saves snapshots of the flash tables 201 including a previous version of the flash tables and a current version of the flash tables under the direction of the CPU 710. The non-volatile memory 140/150, shown as the MRAM in FIG. 1b, stores changes to the flash tables 201 under the direction of the CPU 710. The NAND shown in the flash subsystem 110 in FIG. 1b includes the table copies 360 that stores one or more copies of the flash tables 201 and the table updates 302, stored in the MRAM shown in FIG. 1b, saves updates or changes to the flash tables 201. Either the previous or the current version of the snapshot of the flash tables saved in the table copies 360 and the stored changes, saved in the table updates 302, are used to reconstruct the flash tables 210 upon power interruption.

FIG. 3a shows a flash management table 201, in accordance with an embodiment of the invention. The table 201 includes various tables and details of certain areas of the table 201 are shown in FIGS. 3b-3e. For example, the table 201 is shown to include a logical address-to-physical address table 202, a defective block alternate table 204, a miscellaneous table 206, and an optional physical address-to-logical address table 208. A summary of the tables within the table 201 is as follows:

Logical Address to Physical (L2P) Address Table 202
Defective Block Alternate Table 204
Miscellaneous Table 206
Physical Address to Logical (P2L) Address Table (Optional) 208

The table 202 (also referred to as "L2P") maintains the physical page address in flash corresponding to the logical page address. The logical page address is the index in the table and the corresponding entry 210 includes the flash page address 212.

The table 220 (also referred to as "Alternate") keeps an entry 220 for each predefined group of blocks in the flash. The entry 220 includes a flag field 224 indicating the defective blocks of a predefined group of blocks, the alternate block address field 222 is the address for substitute group block if any of the blocks is defective. The flag field 224 of the alternate table entry 220 for a grouped block has a flag for each block in the grouped block, and the alternate address 222 is the address of substitute grouped block. The substitute for a defective block in a grouped block is the corresponding block (with like position) in the alternate grouped block.

The table 206 (also referred to as "Misc") keeps an entry 230 for each block for miscellaneous flash management functions. The entry 230 includes fields for block erase count (also referred to as "EC") 232, count of valid pages in the block (also referred to as "VPC") 234, various linked list pointers (also referred to as "LL") 236. The EC 232 is a value representing the number of times the block is erased. The VPC 234 is a value representing the number of valid pages in the block. Linked Lists are used to link a plurality of blocks for example a Linked List of Free Blocks. A Linked List includes a head pointer; pointing to first block in the list, and a tail pointer pointing to the last element in the list. The LL 236 field points to the next element in the list. For a double linked list the LL field 236 has a next pointer and a previous pointer. The same LL field 236 may be used for mutually exclusive lists, for example the Free Block Linked List and the Garbage Collection Linked List are mutually exclusive (blocks can not belong to both lists) and can use same LL field 236. Although only one LL field 236 is shown for Misc entry 230 in FIG. 3d, the invention includes embodiments using a plurality of Linked List fields in the entry 230.

The physical address-to-logical address (also referred to as "P2L") table 208 is optional and maintains the logical page address corresponding to a physical page address in flash; the inverse of L2P table. The physical page address is the index in the table 208 and the corresponding entry 240 includes the logical page address field 242.

The size of some of the tables is proportional to the capacity of flash. For example the L2P table 202 size is (number of pages) times (L2P table entry 210 size), and number of pages is capacity divided by page size, as a result the L2P table 202 size is proportional to capacity of flash 110.

Another embodiment of FIG. 1 that uses a limited amount (i.e. not scaled with capacity of flash 110) of MRAM in non-volatile memory module 762 will be presented next. In this embodiment the tables are maintained in system memory The tables in system memory 746 are near periodically and/or based on some events (such as a Sleep Command, or number of write commands since last copy back) are copied back to flash 110. The updates to tables in between copy back to flash are additionally written to the non-volatile memory module 762, and identified with a revision number. The updates associated with last two revisions number are maintained and updates with other revision number are not maintained. When performing table save concurrent with host commands, to minimize impact on latency and performance, the table save operation is interleaved with the user operations at some rate to guarantee completion prior to next copy back cycle. Upon power up, the last saved copy of tables in flash are copied to system memory 746 and appropriate updates in the non-volatile memory are applied to the tables to reconstruct the last state of tables.

FIG. 3b shows further details of the entry 212 of table 202. FIG. 3c shows further details of the entry 220 of table 204. The entry 220 is shown to include the fields 222 and 224. FIG. 3d shows further details of the entry 230 of table 206. The entry 230 is shown to include the fields 232, 234, and 236. FIG. 3e shows further details of the entry 240 of table 208 including field 242.

FIG. 4 shows exemplary data structures stored in each of the MRAM 140/150, system memory 746, and flash 110 of the embodiments of prior figures. The data structures in the system memory 746 include flash tables 340. The data structure in flash 110 includes a first copy 362 and a second copy 364 of the tables 340 in the system memory 746, copies 362 and 364 are identified with a revision number, revision numbers are sequential, the current copy being associated with a larger revision number and the previous copy with a smaller revision number. The copies 362 and 364 are similar to a snapshot (snapshots taken from the time that copy to flash was initiated till the time the copy is completely written to flash) and updates to table 340 since the snapshot was initiated till the next snapshot is initiated would be missing from copy in flash and are saved in MRAM 140/150. The data structures in the MRAM 140/150 include the directory 310, a first updates 320 to the tables, a second update 330 to the tables, pointers 312, pointers 314, and revision number 316. As shown in FIG. 4 information from host (also referred to as "user data") 366 is stored in flash 110.

The current update in MRAM 140/150 alternates between the first update 320 and the second update 330, when a copy of flash tables 340/201 in system memory 746 to flash 110 is initiated. After the copy is successfully written to flash the previous update in MRAM 140/150 is de-allocated. Similarly the current copy in flash alternates between the first copy 362 and the second copy 364. After the copy is successfully written to flash the previous copy in flash 110 is erased.

The pointers 314 is a table of pointers to locations in the flash 110 where the copies 362 and 364 are located includes a first pointers for first copy 362 and a second pointer for the second copy 364. The pointers 312 is a table of pointers pointing to addresses in the MRAM 140/150 where updates 320 and 330 are located. The revision number 316, is a table of entries where revision number associated with first copy 362 and second copy 364 and corresponding updates are saved. The directory 310 includes pointers to the above tables.

The revision number additionally includes a flags field, the flags field to indicate the state of the tables (table updates and table copies) associated with the revision number. The flags and associated states are shown in an exemplary table below:

TABLE 1 update/copy States and associated with flags in revision #

| Flags | | | |
|---|---|---|---|
| f2 | f1 | f0 | State |
| 0 | 0 | 0 | Not Used: De-Allocated previous update and Erased previous flash copy |
| 0 | 0 | 1 | Used |
| 0 | 1 | 1 | Flash Copy In Progress |

TABLE 1-continued update/copy States and associated with flags in revision #

| Flags | | | |
|---|---|---|---|
| f2 | f1 | f0 | State |
| 0 | 1 | 0 | Flash Copy Completed and De-Allocation of previous update In Progress |
| 1 | 1 | 0 | De-Allocation of previous update completed |
| 1 | 0 | 0 | Erase of previous flash Copy In Progress |

The above table is exemplary of having persistent state associated with tables and copies, for example De-Allocation of previous update completed State can be combined to also indicate Erase of previous flash Copy In Progress State—. Using flags is a means of providing various persistent state information about tables and copies other means fall within the scope and spirit of the invention.

FIG. 4a shows an exemplary structure of table 320 and table 330. Table 320 includes the associated revision number and a–number of entries, the entry 322 is an exemplary entry in the updates 320. Table 330 includes the associated revision number and a plurality of entries, the entry 332 —is an exemplary entry in the updates 330.

The entry 322 is shown to include of a Begin Entry 324 record, a Block Information 325 record, a Table Changes 326 record, and an End Entry 328 record. The Begin Record 324 is a record with a signature indicating the beginning of a record, the Block Information 325 is record that includes the LBA of Blocks being written, associated PBA, and length information including the length of the Entry 322. The Table Changes 326 record includes a plurality of table changes, the entry 327 is an exemplary table change in the record and includes two fields, an offset field 327a and a data field 327b, the offset field and the data field respectively identify a location and data used to update the location. For example, the offset field 327a indicates the offset from a location starting from the beginning of a table that is updated and the data field 327b indicates the new value to be used to update the identified location within the table. (offset 0 is reserved).

The entry 323 is analogous to entry 322.

Accordingly, the device 750 of FIG. 1 is configured to store information from the system via PCIe bus 731-p, in blocks at physical addresses, and the system memory 746 includes the flash tables 340 used for flash block management. The flash tables 340 maintain information used for flash block management in the device 750, including tables used to map logical to physical blocks for identifying the location of stored data in the SSD.

The flash subsystem 110 includes a plurality of flash devices that is configured to store copies (snapshots) of flash tables 340, the copies include a first copy 362 and a second copy 364. Copies 362 and 364 are identified with a revision number. The revision number additionally includes a flags field to indicate the state of the tables, revision numbers are sequential, the current copy being associated with a larger revision number and the previous copy with a smaller revision number. Updates to flash tables 340 from the time the copy to flash is initiated until the time the next copy to flash is initiated are additionally saved in MRAM 762 or 740 depending on the embodiment used and identified with the same revision number. Further, the copies in flash along with updates in MRAM are used to reconstruct the flash tables of the system memory upon power interruption to the solid state storage device 750.

FIG. 4b shows a process flow of the relevant steps performed in writing an entry 322/332 in update 320/330 at the Beginning and Ending of writing to user data 366 in flash 110 using the embodiments shown and discussed above and in accordance with a method of the invention. The steps of FIG. 4b are generally performed by the CPU 710 of the system 855 of FIG. 1. The Begin Write process includes the following steps, at step 392 write block information in Block Information 325 record in current entry in the current update, next at step 393 write Begin Entry 324 record in the current entry 322 in current update, next at 394 writing the blocks of data to user area in flash is scheduled. The End Write process includes the following steps after completion of write to user area: At step 396 write Table Changes 326 record in current entry in current update, at step 397 write End Entry 328 record in current entry in current update. The above steps allows crash recovery, to clean up flash area and tables in the event of a crash or power failure. Briefly in accordance with embodiments of the invention an Entry not including a valid End Entry indicates a crash occurred and Table Changes 326 can be ignored an Entry with a valid Begin Entry and with an invalid End Entry indicates possible crash during writing user data and possible dirty flash blocks, information about location of dirty blocks is in Block Information Field and can be used for cleaning up dirty blocks in flash 110.

FIG. 5 shows a process flow of the relevant steps performed in saving flash tables in system memory to flash using the embodiments shown and discussed above, in accordance with a method of the invention. The steps of FIG. 5 are generally performed by the CPU 710 of the system 855 of FIG. 1.

In FIG. 5, at step 372, the value of current revision number is incremented, first the current revision number is identified and then the value of current revision number is incremented. Note that at this point, the flag field associated with current revision number is 010 (Flash Copy Completed), and the flag field associated with previous revision number is 000 (Not Used; i.e De-Allocated previous update and Erased Flash Copy for previous revision).

Next, at step 347, the directory 310 that resides in the MRAM 140/150 is updated. Directory 310 update includes following:

write the incremented value of current revision number with flag 001 (indicating being Used) to the entry in revision 316 table associated with previous revision which will cause this entry to becomes current revision (a higher revision number) in a transitory state (i.e. being Used) and what was the current revision before becomes previous revision (a lower revision number), assign addresses (block and or page) in flash for the location of copy in flash, write the assigned flash addresses to the entry in pointers 314 table associated with previous revision, Next, at step 376, the copying of tables 340 from the system memory 746 to the flash 110 is scheduled and started. As mentioned before to minimize impact on latency and performance, the table copy operation is interleaved with the user operations at some rate to guarantee completion prior to next copy back cycle. Next, at step 378, a determination is made of whether or not the copying of step 376 to flash is completed and if not, time is allowed for the completion of copying, otherwise, the process continues to step 379.

Step 378 is performed by "polling", known to those in the art, alternatively, rather than polling, an interrupt routine is used in response to completion of flash write fall within scope of invention. Other methods, known to those in the art, fall within the scope of invention.

Next, at step 379, directory 310 is updated, the flag associated with current revision number is updated to 010 (Flash Copy Completed), and the process continues to step 380.

Next, at step 380, the update area in the MRAM 140/150 allocated to updates of previous revision number is de-allocated, the steps include following:

write a predefined value indicating invalid value (in this example all zero; offset zero is reserved) to the update area in the MRAM 140/150 allocated to updates of previous revision number, (this is to enable locating last address written in updates in the event of power interruption)

the flag associated with previous revision number is updated to 110 (De-Allocation Completed)

At step 382, the table for the previous revision number 362 in the flash 110 is erased, the steps include following:

the flag associated with previous revision number is updated to 100 (Erase Flash Copy In Progress)

the blocks in flash corresponding to table copies associated with previous version are erased, and flash tables in system memory are updated accordingly the flag associated with previous revision number is updated to 000 (Erase Flash Copy In Progress)

When copy is completed at 378 and Directory updated at step 379, the current copy in the flash 110, along with updates to tables in MRAM with current revision number can advantageously completely reconstruct the tables 340 in the event of a power fail.

If copy is not completed at 378 or the Directory 310 is not updated at step 379 due to power interruption (the associate state/flag is Flash Copy In progress011), the previous revision copy in the flash 110, along with both previous revision and current revision updates to tables in MRAM can advantageously completely reconstruct the tables 340 in the event of a power fail.

FIG. 6 shows another exemplary data structures stored in each of the MRAM 140/150, system memory 746, and flash 110 of the embodiments of prior figures, in accordance with an embodiment of the invention. In FIG. 6 it is shown that table update copies are additionally stored in flash 110 in order to reduce the size of updates in MRAM 140/150 and frequency of flash table copy back to flash 110. one or more of the updates along with associated revision number are additionally saved in Flash 110. The current update in MRAM 140/150 alternates between the first update 320 and the second update 330, when one update is near full it switches to the other update and copies the previous update to flash 110, and then de-allocates the previous update in MRAM. a copy of flash tables 340/201 in system memory 746 to flash 110 is initiated after a predetermined number of updates are copied to flash, and during table copy, as the updates alternate the previous is copied to flash. After the table copy is successfully written to flash the previous updates in flash are erased. the current version of the block management table in flash along with past updates saved in flash and recent updates saved in MRAM is used to reconstruct the flash block management tables in system memory upon system power up.

Although the invention has been described in terms of specific embodiments using MRAM, it is anticipated that alterations and modifications thereof using similar persistent memory will no doubt become apparent to those skilled in the art. It is therefore intended that the following claims be interpreted as covering all such alterations and modification as fall within the true spirit and scope of the invention.

What is claimed is:

1. A computer system comprising:
a central processing unit (CPU), the CPU including a PCIe controller;
a system memory coupled to the CPU and including flash tables; and
a plurality of physically-addressed solid state disks (SSDs) individually coupled, through a PCIe bus, to the CPU and individually responsive to one or more queued commands, each of the queued commands including a physical address and using the physical addresses to identify the location of data to be stored in or retrieved from at least one of the plurality of physically-addressed SSDs, in blocks, each of the plurality of physically-addressed SSDs being located externally to the CPU, the PCIe controller coupled to the plurality of physically-addressed SSDs, each of the SSDs including a flash subsystem and a non-volatile memory, the flash subsystem including one or more copies of the flash tables and the non-volatile memory having magnetic random access memory (MRAM) that stores updates to the copy of the flash tables, the flash tables including tables used to map logical to physical blocks for identifying the location of data in the physically-addressable SSD,
wherein the updates to the copy of the flash tables and the one or more copies of the flash tables are used to reconstruct the flash tables upon power interruption.

2. The computer system, as recited in claim 1, wherein the flash subsystem is made of flash NAND memory.

3. The computer system, as recited in claim 1, wherein the flash subsystem is made of flash NOR memory.

4. The computer system, as recited in claim 1 wherein the flash subsystem includes a flash address space including a MRAM address space mapped to the flash address space wherein access of any one of the spaces of the MRAM address space that are mapped to the flash address space is indicative of access of a space, in the MRAM, corresponding to the mapped MRAM address space.

5. The computer system, as recited in claim 1, wherein the non-volatile memory includes spin-transfer torque MRAM (STTMRAM).

6. The computer system, as recited in claim 1, wherein the system memory stores a software driver for managing the flash tables.

7. The computer system, as recited in claim 1, wherein the physically-addressable SSD includes a CPU sub-system.

8. The computer system, as recited in claim 1, wherein the CPU sub-system is operable to use a flag indicative of accessing the MRAM or the flash sub-system.

9. The computer system, as recited in claim 1, wherein the physical addresses identifying the at least one of the plurality of physically-addressed SSDs are identical to addresses in read or write commands.

10. A computer system comprising:
a plurality of physically-addressed solid state disks (SSDs) individually coupled, through a PCIe bus, to the CPU and individually responsive to one or more queued commands, each of the queued commands including a physical address, the queued commands using the physical addresses to identify the location of user data to be stored in or retrieved from at least one of the plurality of physically-addressed SSDs, in blocks, each of the plurality of physically-addressed SSDs being located externally to the CPU, the PCIe controller coupled to the plurality of physically-addressed SSDs, each of the physically-addressed SSDs having associated therewith physical addresses provided by the CPU; and
a system memory coupled to the CPU, the system memory including flash tables used to manage blocks in the physically addressed SSD, the flash tables including tables used to map logical to physical blocks for identifying the location of stored data in the physically addressed SSD, the physically-addressable SSD including a non-volatile memory and a flash subsystem that includes flash memory configured to save snapshots of the flash tables including a previous version of the flash tables and a current version of the flash tables under the direction of the CPU, the non-volatile memory including a magnetic random access memory (MRAM) that stores changes to the flash tables beyond the snapshots of the flash tables under the direction of the CPU, wherein either the previous or the current version of the snapshot of the flash tables and the stored changes are used to reconstruct the flash tables upon power interruption, further wherein the PCIe controller is operable to use a flag indicative of accessing the MRAM or the flash subsystem.

11. The computer system, as recited in claim 10, wherein the flash subsystem is made of flash NAND memory.

12. The computer system, as recited in claim 10, wherein the flash subsystem is made of flash NOR memory.

13. The computer system, as recited in claim 10, wherein the MRAM is spin-transfer torque MRAM (STTMRAM).

14. The computer system, as recited in claim 10, wherein system memory is configured to store a software driver for managing the flash tables.

15. The computer system, as recited in claim 14, wherein the flash subsystem includes a flash address space including a MRAM address space mapped to flash address space wherein access of any one of the spaces of the MRAM address space mapped to flash address space is indicative of access of a corresponding space in the MRAM.

16. The computer system, as recited in claim 10, wherein the CPU includes a controller coupled to the physically-addressable SSD.

17. The computer system, as recited in claim 10, wherein the physically-addressable SSD includes a CPU sub-system.

18. The computer system, as recited in claim 17, wherein the CPU sub-system is operable to use a flag indicative of accessing the MRAM or the flash sub-system.

19. The computer system, as recited in claim 10, wherein the physical addresses identifying the at least one of the plurality of physically-addressed SSDs are identical to addresses in read or write commands.

* * * * *